United States Patent Office 2,828,574
Patented Apr. 1, 1958

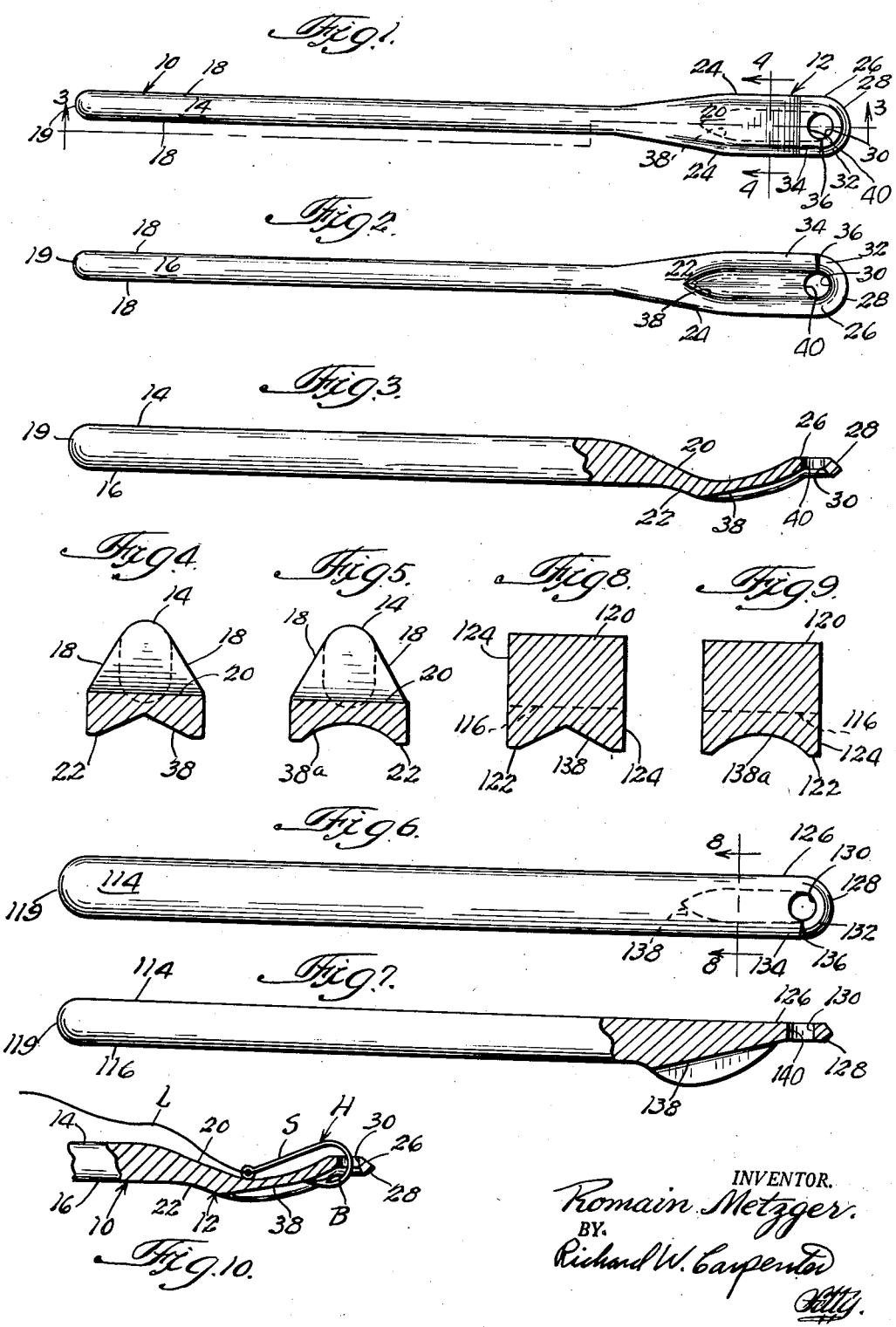

2,828,574

FISH HOOK EXTRACTOR

Romain Metzger, Chicago, Ill., assignor to Anglers' Manufacturing Corporation, Chicago, Ill., a corporation of Illinois Application June 13, 1956, Serial No. 591,045

6 Claims. (Cl. 43—53.5)

This invention relates to fish hook extractors and more particularly to a device for disengaging and extracting an embedded fish hook from the body or mouth of a fish or other marine creature.

The invention comprehends a device which may be applied to and guided along a fish line into engagement with an embedded fish hook and readily manipulated to effect the safe and prompt removal of the hook from the fish.

As is well known to those familiar with the art of fishing, a serious problem with which fishermen are constantly faced is that of conveniently, expeditiously, and safely removing embedded fish hooks from the bodies or mouths of fish.

The sharply barbed construction of conventional fish hooks renders their removal from the fish extremely difficult and sometimes hazardous to the fishermen. Although it is possible to pull or tear an embedded hook out of the body of a fish with a pair of pliers or other clamping device, such a crude method of extraction is highly undesirable from the standpoint of both the fish and the fisherman. Not only is the flesh of the fish ripped and torn, but there is always the likelihood of the fisherman sustaining a painful or infectious injury to his hands.

Also, inasmuch as the game preservation laws require the prompt return of caught undersized fish to their waters, in order to prevent serious injury or death to the fish, it is highly essential that the method of hook extraction be speedy and without danger or harm to the fish.

It is, therefore, an important object of this invention to provide a device of relatively simple design and construction capable of disengaging and extracting embedded fish hooks from the mouths and bodies of fish.

Another object of the invention is the provision of a fish hook extractor that will facilitate the removal of embedded fish hooks from the bodies of fish without tearing the flesh of the fish or otherwise injuring or damaging the fish in any way.

Another object of the invention is the provision of a mechanical fish hook extractor that can be safely utilized to effect the removal of an embedded fish hook without any danger of injury to the person operating the device.

A further object of the invention is to provide a fish hook extractor that will accommodate the disengagement and removal of fish hooks of varying sizes.

Yet another object of the invention is the provision of a device that may be applied to and guided along a fish line into engagement with an embedded hook, and, thereafter, readily manipulated to effect the removal and extraction of the hook from the body of a fish.

A more specific object of the invention is the provision of a fish hook extractor comprising a body and guide head having means to detach a hook from the body of the fish and guide the hook onto the extractor where it can be retained with the barbed portion of the hook recessed below the surface of the device.

These and other objects of the invention will be apparent from an examination of the following description and drawings, wherein:

Figure 1 is a fragmentary top plan view of a device embodying features of my invention;

Figure 2 is a bottom plan view of the structure illustrated in Figure 1;

Figure 3 is a fragmentary longitudinal vertical sectional view taken on line 3—3 of Figure 1;

Figure 4 is a fragmentary transverse vertical sectional view taken on line 4—4 of Figure 1;

Figure 5 is a view similar to Figure 4, but illustrating a modified form of the device;

Figure 6 is a fragmentary top plan view of another embodiment of my invention;

Figure 7 is a side elevational view partly in section of the structure illustrated in Figure 6;

Figure 8 is a fragmentary transverse vertical sectional view taken on line 8—8 of Figure 6;

Figure 9 is a view similar to Figure 8, but illustrating a modified form of the device; and Figure 10 is a view similar to Figure 3, but illustrating the position of a fish hook upon the extractor after removal of the hook from the fish.

It will be understood that certain portions of the structure have been intentionally omitted from certain views where they are illustrated to better advantage in other views.

Referring now to the Figures 1–4 of the drawings for a better understanding of the invention, it will be seen that the novel fish hook extracting device may be formed of any material that affords some degree of flexibility and comprises an elongated body, indicated generally at 10, having an integral guide head, indicated generally at 12, formed on one end thereof.

The body 10, for the major portion of its length, is preferably straight and substantially rectangular in vertical cross section, presenting generally parallel upper and lower surfaces 14 and 16, respectively, and generally parallel side surfaces 18. The edges between adjacent surfaces are preferably rounded to eliminate sharp corners.

At the forward end of the body, the distance between the upper and lower surfaces 14 and 16 decreases while the distance between the side surfaces 18 increases to form a guide head 12, which as best seen in Figures 1 and 3, is wider and thinner than the body 10.

The upper, lower, and side surfaces 14, 16 and 18, respectively, of the body 10, merge or blend into upper, lower, and side surfaces 20, 22, and 24, respectively, of the guide head 12.

At its forward end, the head 12 presents a relatively thin end section or tip portion 26, having a forward edge 28, which is substantially arcuate, as seen in plan view, and preferably flat, as seen in side view. The tip 26 is in the form of a semi-loop or semi-bail, as seen in plan, and presents a preferably arcuate opening or passageway 30 extending therethrough from top to bottom which affords communication between the upper and lower head surfaces 20 and 22, respectively. The opening 30 is preferably located approximately centrally of the tip and is spaced a relatively short distance inwardly from the side and end surfaces 24 and 26, respectively. All edges between adjacent surfaces of the head may be rounded slightly to prevent sharp corners.

The portion of the tip adjacent one side of opening 30 is preferably split to form abutting ends 32 and 34 which are separable upon the application of pressure therebetween to define a slit or slot 36, affording communication between the opening 30 and the related side surface 24 of the head tip.

As best seen in Figure 3, the portion of the head lying between the body 10 and the head tip portion 26 is bowed whereby the upper head surface 20 is concave and the lower head surface 22 is convex. The upper surface 20 is preferably flat while the lower surface 22 presents a longitudinally extending groove or channel 38, which diminishes rearwardly of the head where the head merges with the body of the device, and which extends forwardly to opening 30 of head tip 26.

The groove 38 is preferably V-shaped, as seen in Figure 4, although, if desired, groove 38 may be arcuate, as seen in Figure 5. The width of groove 38, at its outermost or widest portion, is preferably of the same distance as the diameter of tip opening 30 at the rearward side of opening 30, the tip presents a lip 40.

A modified form of my invention is illustrated by Figures 6–9 wherein elements similar to those of the first described embodiment have been designated by corresponding numerals.

The modified form of my invention is provided with upper and side surfaces of the head which are disposed in the same planes as, and which blend directly into, the upper and side surfaces of the body. However, in this embodiment the lower surface 122 of the head and tip is generally the same as the corresponding surface 22 of the first described embodiment, and presents a similar groove which may be either V-shaped, as 138 in Figure 8, or arcuate, as 138a in Figure 9.

To describe the operation of the device, it will be understood that the body portion 10 of the extractor is held by the operator with the upper surface 20 of the head disposed away from the fish hook H, and with the lower surface 22 disposed toward the hook. The device is held with its longitudinal axis disposed in a plane generally normal to the fish line L, as the line is urged through the slit 36 and into tip opening 30. Abutting ends 32 and 34 are separable upon the application of the pressure of the line therebetween and once the line is within the opening 30, serve to retain it therewithin. The rearward end of the extractor is then elevated until the longitudinal axis of the device is almost parallel to the line, at which time the device is pushed downwardly along the line toward the fish hook embedded within the body or mouth of the fish.

As the head of the device encounters the hook, lip 40 of head tip 26 engages the portion of the flesh of the fish which is on the hook and disgorges the flesh from the shank S and barb B of the hook. As relatively light but firm pressure is applied on the device against the fish the shank of the hook is guided through tip opening 30. After the hook is completely removed from the flesh of the fish, the fish drops off the hook and the shank S comes to rest on the upper surface 20 of the head while the barb B comes to rest within the groove 38 of the lower surface 22 of the head. With the barb of the hook firmly disposed within the head groove, the device can be handled by the operator without danger of being cut by the point of the hook barb. Also, because the novel device disgorges the flesh of the fish from the hook by pushing it therefrom, the flesh is not likely to be torn or ripped and no serious injury is caused to the fish by the removal of the hook.

I claim:

1. A unitary fish hook extractor comprising a generally elongated body including a guide portion disposed inwardly adjacent one end thereof, said guide portion presenting on one side thereof a convex surface having a groove extending longitudinally thereof, said one end as seen in side elevation being generally straight and flat with a curved forward edge as seen in plan and having an opening extending therethrough from top to bottom and a transversely extending slit affording communication between an opening and the outer surface of said end.

2. A unitary fish hook extractor comprising an elongated body having at one end thereof a guide head, said head being rounded as seen in plan at its forward end and presenting inwardly of said end a longitudinally extending convexly curved guide surface having therein a longitudinally extending groove, said end having an opening extending therethrough adjacent the forward end of said groove and a transversely extending slit affording communication between said opening and an outer surface of said head.

3. A unitary fish hook extractor comprising an elongated flexible body having an integral head formed on the forward end thereof, said head presenting a rounded forward edge as seen in plan and an opening extending therethrough from top to bottom located rearwardly adjacent said edge, one side of said head being slit adjacent said opening to form abutting ends separable upon the application of pressure therebetween to afford communication between said opening and an outer surface of the head, said head presenting rearwardly of said opening a longitudinally extending convex surface having therein a groove extending lengthwise thereof.

4. A unitary fish hook extractor comprising a generally elongated body with a curved forward edge having an opening extending therethrough from top to bottom located inwardly adjacent said forward edge and having a slit affording communication between said opening and an outer surface of the body, said body presenting rearwardly adjacent said opening a longitudinally extending convex surface having therein a groove extending lengthwise of the body and communicating with said opening.

5. A fish hook extractor according to claim 4 wherein said slit divides the body to form abutting ends on one side of the body, said ends being separable upon the application of pressure therebetween.

6. A unitary fish hook extractor comprising a generally elongated body having an integral head formed at one end thereof, said head being rounded at its forward edge and presenting as seen in plan on one side thereof a convex surface extending longitudinally of the body, said surface presenting a groove extending lengthwise thereof, said head having an opening extending therethrough located between the forward end of said groove and the forward edge of the head, and a slit extending transversely of the head interconnecting the opening and an outer surface of the head.

References Cited in the file of this patent

UNITED STATES PATENTS

| | | |
|---|---|---|
| 2,561,281 | Lawrence | July 17, 1951 |
| 2,634,539 | Brown et al | Apr. 14, 1953 |
| 2,644,268 | Klinicki | July 7, 1953 |
| 2,695,471 | Imberti | Nov. 30, 1954 |

FOREIGN PATENTS

| | | |
|---|---|---|
| 489,846 | Italy | Jan. 29, 1954 |
| 623,872 | France | Mar. 28, 1927 |
| 648,335 | France | Aug. 13, 1928 |